(12) United States Patent
Sakai et al.

(10) Patent No.: US 8,901,866 B2
(45) Date of Patent: Dec. 2, 2014

(54) MOTOR DRIVE APPARATUS EQUIPPED WITH ENERGY STORAGE UNIT

(75) Inventors: Koujirou Sakai, Yamanashi (JP); Yasusuke Iwashita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 167 days.

(21) Appl. No.: 13/471,542

(22) Filed: May 15, 2012

(65) Prior Publication Data

US 2012/0326641 A1 Dec. 27, 2012

(30) Foreign Application Priority Data

Jun. 24, 2011 (JP) ................................. 2011-140776

(51) Int. Cl.
| | | |
|---|---|---|
| *H02P 27/00* | (2006.01) | |
| *H02J 3/32* | (2006.01) | |
| *H02J 1/16* | (2006.01) | |
| *H02P 3/18* | (2006.01) | |
| *H02J 3/30* | (2006.01) | |

(52) U.S. Cl.
CPC ... *H02J 3/30* (2013.01); *H02J 3/32* (2013.01); *H02J 1/16* (2013.01); *Y02E 60/16* (2013.01); *H02P 3/18* (2013.01)
USPC .................. 318/400.31; 318/150; 318/400.3; 318/795; 318/817; 318/161; 307/66; 307/9.1; 713/320; 320/103

(58) Field of Classification Search
CPC . B60L 11/16; Y02T 10/7033; Y02T 10/7005; Y02T 10/7077; Y02T 10/7055; Y02E 60/16; Y02E 60/12; B60K 1/02; H02J 3/30; H02J 3/32; H02J 9/062; H02J 7/34; H02J 9/061; H02J 3/382; H02J 7/0063; H02J 7/0024; H02J 9/06; H02J 7/022; H02J 7/0093; H02J 2007/0059; H02J 7/0068; H02J 7/0016; H02J 7/0018; H02J 7/0013; H02J 7/0073; H02K 7/025; H02K 17/08; H02K 57/006; H02P 1/445; H02P 1/44; H02P 1/42; H02P 1/12; H02P 25/04; H02P 6/001; H02P 6/085; H02P 6/00; B60W 10/08; B60W 20/00; A61N 1/36032; A61N 1/378; H04R 25/606; G06F 1/30; G06F 1/26; H02M 3/07; H02M 3/18; H03K 3/537; H03K 3/57; H03K 17/955; G01R 23/09; G01R 23/02; G01R 23/15; G01R 27/2605; G01R 31/3648; A61B 5/0245; G01P 3/4805; G01D 5/24; F02P 17/00; F02P 17/12; F02P 3/0838; H01M 10/44; H01M 10/441

USPC ............ 318/795, 817, 150, 161, 400.31, 507, 318/130, 139; 307/48, 60, 65, 66, 9.1, 64; 320/101, 134, 128; 363/37, 34, 65

See application file for complete search history.

(56) References Cited

U.S. PATENT DOCUMENTS

| | | | | |
|---|---|---|---|---|
| 5,994,794 | A | * | 11/1999 | Wehrlen .......................... 307/66 |
| 6,184,593 | B1 | | 2/2001 | Jungreis |
| 7,752,878 | B2 | | 7/2010 | Schmeink |
| 7,868,569 | B2 | | 1/2011 | Iwashita et al. |
| 7,925,906 | B2 | * | 4/2011 | Ranganathan et al. ........ 713/320 |
| 2004/0051498 | A1 | * | 3/2004 | Kim ................................ 320/103 |
| 2008/0016940 | A1 | | 1/2008 | Schmeink |
| 2008/0270023 | A1 | | 10/2008 | Kumar |
| 2010/0276993 | A1 | * | 11/2010 | King .............................. 307/9.1 |
| 2011/0041723 | A1 | | 2/2011 | Kumar |

FOREIGN PATENT DOCUMENTS

| | | |
|---|---|---|
| CN | 101090202 A | 12/2007 |
| CN | 101557194 A | 10/2009 |
| CN | 102075138 A | 5/2011 |
| DE | 102004028353 A1 | 1/2006 |
| JP | 2003-230998 A | 8/2003 |
| JP | 2003-333891 A | 11/2003 |
| JP | 2005-295711 A | 10/2005 |
| JP | 2008-023599 A | 2/2008 |
| JP | 2008023599 A | 2/2008 |
| JP | 2009-207305 A | 9/2009 |
| JP | 4339916 B2 | 10/2009 |

OTHER PUBLICATIONS

A JP Office Action, dated Aug. 28, 2012, issued in JP Application No. 2011-140776.
Office Action corresponding to JP 2011-140776, dated Jan. 22, 2013.
Office Action mailed Jan. 22, 2014, corresponds to Chinese patent application No. 201210212520.X.

* cited by examiner

*Primary Examiner* — Kawing Chan
*Assistant Examiner* — Jorge L Carrasquillo
(74) *Attorney, Agent, or Firm* — Lowe Hauptman & Ham, LLP (57) ABSTRACT

A motor drive apparatus includes an AC/DC converter which converts AC power supplied from a power supply to DC power, a DC/AC converter which converts DC power to AC power and vice versa, a DC link unit which connects the DC side of the AC/DC converter to the DC side of the DC/AC converter and delivers the DC power from one to the other and vice versa, an energy storage unit which includes at least one capacitor storage unit and at least one flywheel storage unit each of which is connected to the DC link unit and stores or supplies the DC power, and an energy control unit which performs control so that the energy storage unit stores or supplies the DC power.

18 Claims, 7 Drawing Sheets

MOTOR DRIVE APPARATUS EQUIPPED WITH ENERGY STORAGE UNIT

RELATED APPLICATIONS

The present application is based on, and claims priority from, Japanese Application Number 2011-140776, filed Jun. 24, 2011, the disclosure of which is hereby incorporated by reference herein in its entirety.

BACKGROUND OF THE INVENTION

1. Field of the Invention

The present invention relates to a motor drive apparatus for controlling a motor in which power to drive the motor is provided by first converting AC power supplied from an AC power supply to DC power and then converting the DC power back to AC power, and more specifically to a motor drive apparatus equipped with an energy storage unit that can store the power supplied from the AC power supply as well as the power regenerated by the motor and can supply the stored power to the motor.

2. Description of the Related Art

In a machine tool system, motors are provided one for each drive shaft of a machine tool, and the motors are driven and controlled by a motor drive apparatus. The motor drive apparatus commands and controls the motor speed, torque, or rotor position of each of the motors that drive the respective drive shafts of the machine tool.

The motor drive apparatus includes an AC/DC converter which converts three-phase AC utility power to DC power, a DC/AC converter which converts DC power to AC power of a desired frequency for driving a motor or converts AC power regenerated by the motor back to DC power, and a DC link unit which connects the DC side of the AC/DC converter to the DC side of the DC/AC converter and delivers the DC power from one to the other and vice versa, and the motor drive apparatus controls the motor speed, torque, or rotor position of the motor connected to the AC side of the DC/AC converter.

In many cases, as many DC/AC converters are provided as there are the motors so that the motors connected to the respective drive shafts of the machine tool can be driven and controlled independently of each other, but in some cases, more than one is provided for each motor. On the other hand, as for the AC/DC converter, usually only one AC/DC converter is provided for the plurality of DC/AC converters in order to save the cost and installation space of the motor drive apparatus.

When controlling motor acceleration or deceleration by using such a motor drive apparatus, a power peak occurs because a large AC power output or regeneration is required of the AC power supply. To suppress such power peaks, an energy storage device that can store regenerative power from the motor during deceleration and can reuse the stored power during motor acceleration may be provided on the DC link. In this case, since the AC power regenerated by the motor needs to be converted to DC power that can be stored in the energy storage device, the DC/AC converter is constructed from a semiconductor power converter that can perform conversion in both directions, i.e., not only from DC to AC but also from AC to DC.

Figure 6:
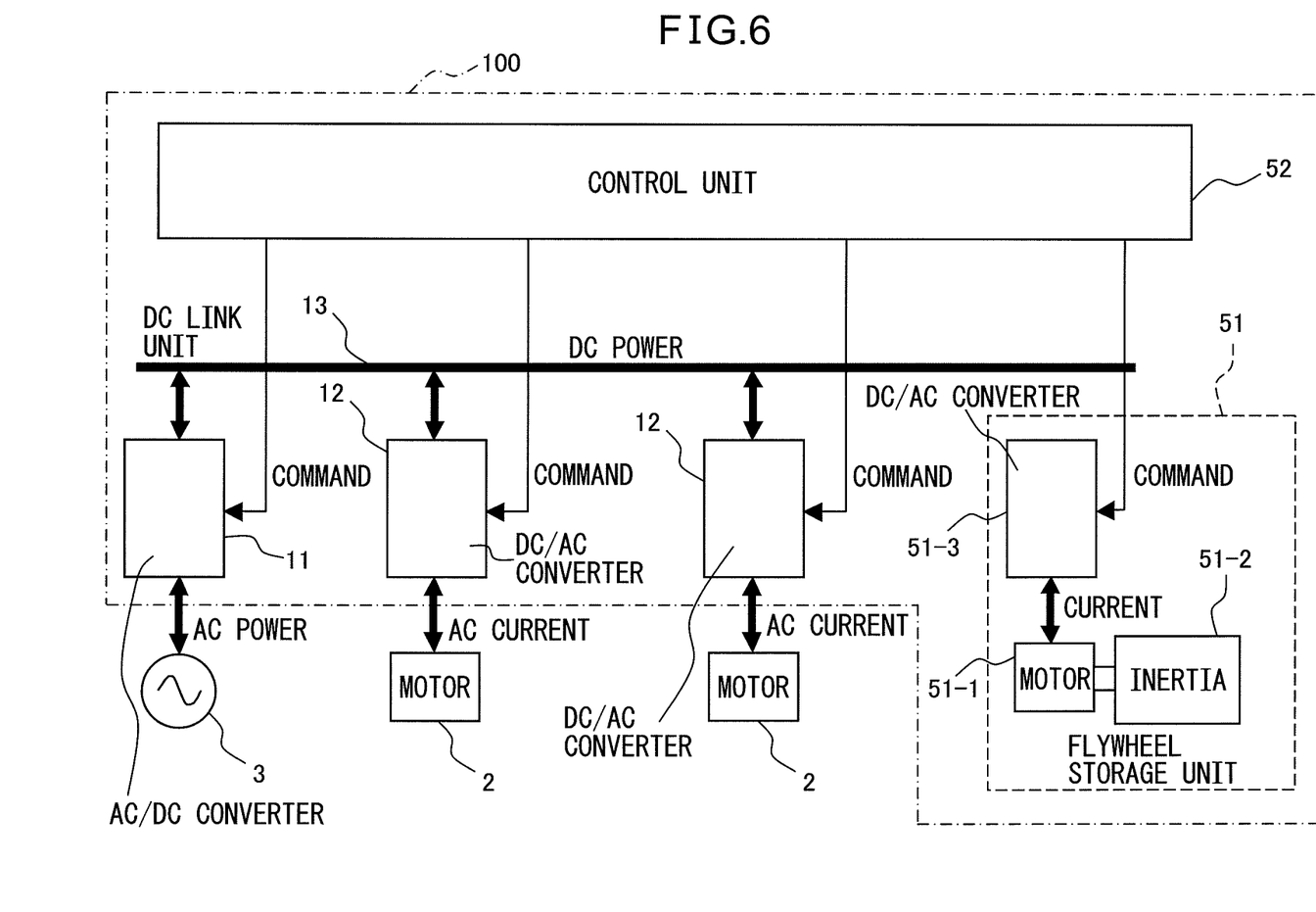
FIG. 6 is a diagram showing one example of a motor drive apparatus using a flywheel according to the prior art.

As an example, an energy storage device using a flywheel is disclosed in Japanese Patent Unexamined Publication No. 2008-023599. FIG. 6 is a diagram showing one example of a motor drive apparatus using a flywheel according to the prior art. It is to be understood that, throughout the different drawings given herein, the same reference numerals designate component elements having the same functions. The motor drive apparatus 100 using a flywheel according to the prior art includes an AC/DC converter 11 which converts AC power supplied from an AC power supply 3 to DC power, a DC/AC converter 12 which converts DC power to AC power for driving a motor 2, a DC link unit 13 which connects the DC side of the AC/DC converter 11 to the DC side of the DC/AC converter 12 and delivers the DC power from one to the other and vice versa, a flywheel storage unit 51 which is connected to the DC link unit 13 and which stores or outputs the DC power, and a control unit 52 which controls the speed, torque, or rotor position of the motor 2 in accordance with a motor operation command for commanding the operation of the motor 2, and which also controls the amount of DC power to be stored or output by the flywheel storage unit 51. Actually, there are as many DC/AC converters 12 as there are the motors 2. For example, the drive shafts of a machine tool are connected one for one to the motors 2. Each DC/AC converter 12 whose switching operation is controlled by the motor operation command from the control unit 52 outputs an alternating current having a frequency and waveform for achieving desired motor operation. The motor 2 is supplied with the alternating current output from the DC/AC converter 12, and the motor 2 is thus driven for rotation. The flywheel storage unit 51 includes an inertia rotating motor 51-1, an inertia 51-2, and a DC/AC converter 51-3. The control unit 52 supplies the DC/AC converter 51-3 with a command for controlling the amount of DC power to be stored or output by the flywheel storage unit 51. If the received command is one that commands the flywheel storage unit 51 to output the DC power, the DC/AC converter 51-3 performs forward conversion from AC to DC so that the energy stored in the inertia 51-2 flows to the DC link unit 13; on the other hand, if the received command is one that commands the flywheel storage unit 51 to store the DC power, the DC/AC converter 51-3 performs reverse conversion from DC to AC so that the energy from the DC link unit 13 flows to the inertia rotating motor 51-1, thereby causing the inertia rotating motor 51-1 mounted with the inertia 51-2 to rotate. In this way, the supplied power energy is stored as the rotational energy of the inertia 51-2. With this arrangement, during acceleration of the motor 2, not only the energy from the AC power supply 3 but also the energy stored in the inertia storage unit 51 is supplied to the motor 2 and used as the power to accelerate the motor 2, and during deceleration of the motor 2, the regenerative energy from the motor 2 flows into the flywheel storage unit 51 for storing therein. The energy stored in the flywheel storage unit 51 is reused when accelerating the motor 2.

Figure 7:
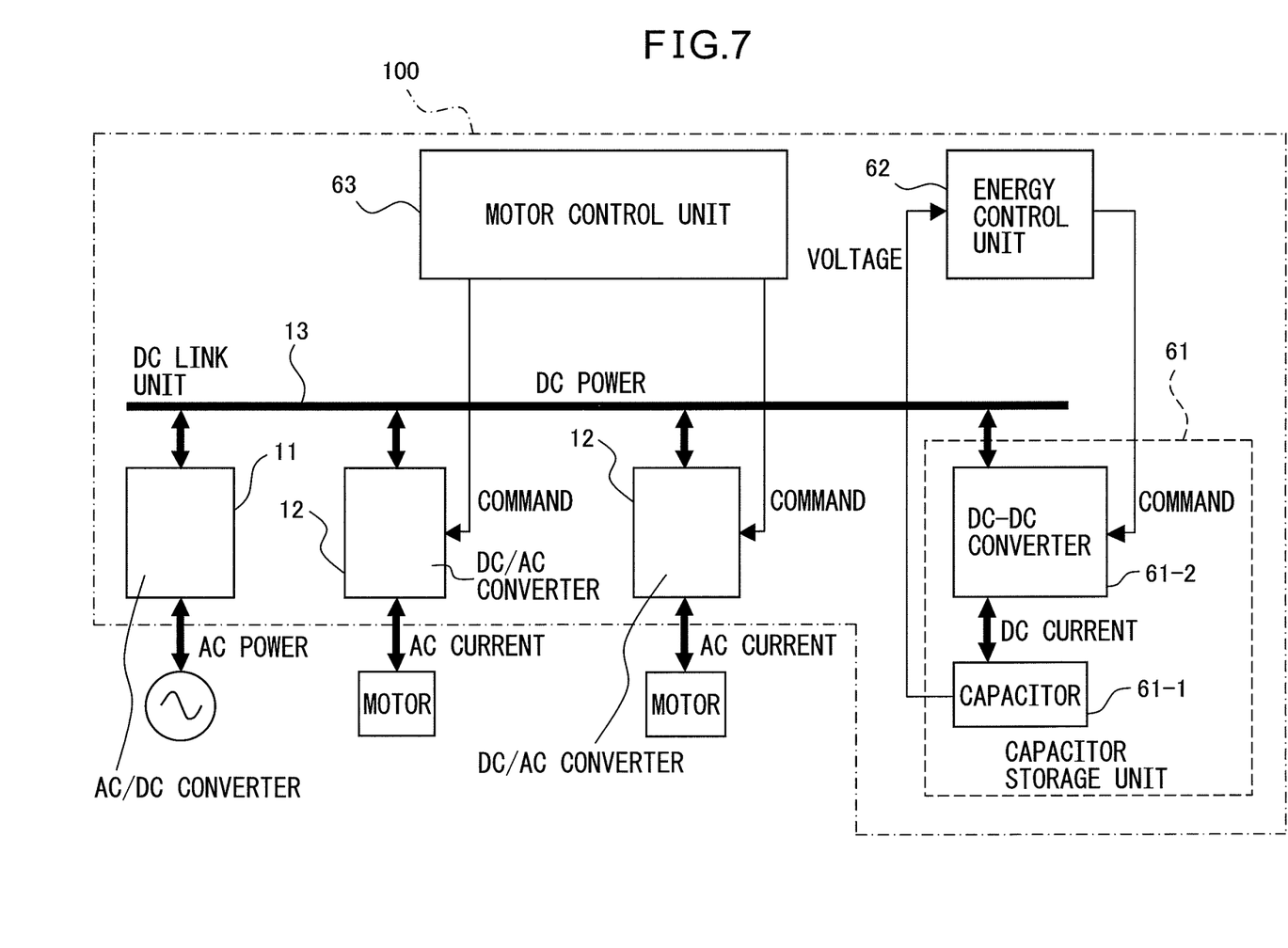
FIG. 7 is a diagram showing one example of a motor drive apparatus using a capacitor according to the prior art.

As another example, an energy storage device using a capacitor is disclosed in Japanese Patent No. 4339916. FIG. 7 is a diagram showing one example of an energy storage device using a capacitor according to the prior art. The motor drive apparatus 100 using a capacitor according to the prior art includes an AC/DC converter 11 which converts AC power supplied from an AC power supply 3 to DC power, a DC/AC converter 12 which converts the DC power to AC power for driving a motor 2, a DC link unit 13 which connects the DC side of the AC/DC converter 11 to the DC side of the DC/AC convertor 12 and delivers the DC power from one to the other and vice versa, a capacitor storage unit 61 which is connected to the DC link unit 13 and which stores or outputs the DC power, an energy control unit 62 which controls the amount of DC power to be stored or output by the capacitor storage unit 61, and a motor control unit 63 which controls the speed, torque, or rotor position of the motor 2 in accordance with a motor operation command for commanding the operation of the motor 2. Actually, there are as many DC/AC converters 12 as there are the motors 2. For example, the drive shafts of a machine tool are connected one for one to the motors 2. Each DC/AC converter 12 whose switching operation is controlled by the motor operation command from the motor control unit 63 outputs an alternating current having a frequency and waveform for achieving desired motor operation. The motor 2 is supplied with the alternating current output from the DC/AC converter 12, and the motor 2 is thus driven for rotation. The capacitor storage unit 51 includes a large-capacitance capacitor 61-1 and a DC-DC converter 61-2. The energy control unit 62 supplies the DC-DC converter 61-2 with a command for controlling the amount of DC power to be stored or output by the capacitor storage unit 61. If the received command is one that commands the capacitor storage unit 61 to output the DC power, the DC-DC converter 61-2 operates so as to make the DC voltage at the side connected to the capacitor 61-1 higher than the DC, voltage at the side connected to the DC link unit 13 so that the energy stored in the capacitor 61-1 flows to the DC link unit 13. On the other hand, if the received command is one that commands the capacitor storage unit 61 to store the DC power, the DC-DC converter 61-2 operates so as to make the DC voltage at the side connected to the capacitor 61-1 lower than the DC voltage at the side connected to the DC link unit 13 so that the energy from the DC link unit 13 flows to the capacitor 61-1 and the energy is thus stored in the capacitor 61-1. With this arrangement, during acceleration of the motor 2, not only the energy from the AC power supply 3 but also the energy stored in the capacitor storage unit 61 is supplied to the motor 2 and used as the power to accelerate the motor 2, and during deceleration of the motor 2, the regenerative energy from the motor 2 flows into the capacitor storage unit 61 for storing therein. The energy stored in the capacitor storage unit 61 is reused when accelerating the motor 2.

The flywheel storage unit according to the above prior art has the advantage that the amount of energy that can be stored per unit volume of the inertia is large. However, it is inefficient in energy utilization because some of the stored energy is lost due to losses that occur in the inertia rotating motor when storing the energy in the inertia or supplying the energy stored in the inertia. The losses that occur in the motor when storing or supplying the energy, for example, amount to 10 to 20% of the total energy.

On the other hand, the capacitor storage unit according to the above prior art has the advantage that the losses that occur in the large-capacitance capacitor when storing or supplying energy are as small as a few percent or less (in the case of an electrolytic capacitor), i.e., the efficiency of energy utilization is high. Furthermore, since the large-capacitance capacitor can be quickly charged and discharged, the capacitor storage unit has the further advantage of being able to address the situation where it is required to quickly supply drive power to the motor. However, since the amount of energy that can be stored per unit volume is smaller in the case of the capacitor storage unit than in the case of the flywheel storage unit, a sufficient amount of energy may not be able to be stored because of the limited mounting space of the large-capacitance capacitor, and power peaks that occur in the AC power supply may not be able to be suppressed as desired.

SUMMARY OF THE INVENTION

In view of the above problems, it is an object of the present invention to provide a motor drive apparatus including an AC/DC converter which converts AC power supplied from an AC power supply to DC power, a DC/AC converter which converts DC power to AC power for driving a motor or converts AC power regenerated by the motor back to DC power, and an energy storage unit which stores or outputs the DC power, wherein provisions are made to be able to efficiently suppress power peaks of the AC power supply, while at the same time, enhancing the efficiency of energy utilization in the energy storage unit.

To achieve the above object, according to a first mode of the present invention, there is provided a motor drive apparatus including: an AC/DC converter which converts AC power supplied from an AC power supply to DC power; a DC/AC converter which converts DC power to AC power for driving a motor or converts AC power regenerated by the motor back to DC power; a DC link unit which connects a DC side of the AC/DC converter to a DC side of the DC/AC converter and delivers the DC power from one to the other and vice versa; an energy storage unit which includes at least one capacitor storage unit and at least one flywheel storage unit each of which is connected to the DC link unit and stores the DC power supplied from the DC link unit or supplies the stored DC power to the DC link unit; an energy control unit which performs control so that the energy storage unit stores the DC power supplied from the DC link unit or supplies the stored DC power to the DC link unit; and a motor control unit which, based on a motor operation command for commanding operation of the motor, performs control so that the DC/AC converter outputs desired AC power.

The energy control unit performs control so that only the capacitor storage unit or only the flywheel storage unit or both the capacitor storage unit and the flywheel storage unit supply the stored DC power to the DC link unit 13 or store the DC power supplied from the DC link unit.

The energy control unit may set a power supply ratio between the capacitor storage unit and the flywheel storage unit for the DC power that the energy storage unit supplies to the DC link unit during acceleration control of the motor performed by the motor control unit, and also set a power storage ratio between the capacitor storage unit and the flywheel storage unit for the DC power that the energy storage unit stores from the DC link unit during deceleration control of the motor performed by the motor control unit.

The energy control unit may perform control so that the DC power that the energy storage unit supplies to the DC link unit is supplied only from the capacitor storage unit when the supply of the DC power from the energy storage unit is started and, when the amount of DC power stored in the capacitor storage unit has decreased to or below a predetermined amount of power, the DC power is supplied only from the flywheel storage unit.

The energy control unit may perform control so that the DC power that the energy storage unit stores from the DC link unit is stored only in the capacitor storage unit when the storage of the DC power by the energy storage unit is started and, when the amount of DC power stored in the capacitor storage unit has reached or exceeded a predetermined amount of power, the DC power is stored only in the flywheel storage unit.

The energy control unit may perform control so that, when the rate of increase of the DC power that the energy storage unit supplies to the DC link unit is not greater than a predetermined value, the DC power is supplied only from the flywheel storage unit. In this case, the energy control unit may perform control so that, when the rate of increase of the DC power that the energy storage unit supplies to the DC link unit is greater than the predetermined value, the DC power is supplied only from the capacitor storage unit or from both the capacitor storage unit and the flywheel storage unit.

The energy control unit may perform control so that, when the rate of increase of the DC power that the energy storage unit stores from the DC link unit is not greater than a predetermined value, the DC power is stored only in the flywheel storage unit. In this case, the energy control unit 15 may perform control so that, when the rate of increase of the DC power that the energy storage unit stores from the DC link unit is greater than the predetermined value, the DC power is stored only in the capacitor storage unit or in both the capacitor storage unit and the flywheel storage unit.

The energy control unit may perform control so that the DC power that the energy storage unit supplies to the DC link unit is supplied only from the capacitor storage unit when the amount of DC power is not larger than a predetermined amount of power. However, when the amount of DC power is larger than the predetermined amount of power, the DC power is supplied only from the flywheel storage unit or from both the capacitor storage unit and the flywheel storage unit.

The energy control unit may perform control so that the DC power that the energy storage unit stores from the DC link unit is stored only in the capacitor storage unit when the amount of DC power is not larger than a predetermined amount of power. However, when the amount of DC power is larger than the predetermined amount of power, the DC power is stored only in the flywheel storage unit or in both the capacitor storage unit and the flywheel storage unit.

When the AC power that is supplied from the AC power supply to the motor via the AC/DC converter, the DC link unit, and the DC/AC converter exceeds a predetermined limiting value, the energy control unit may perform control so that the energy storage unit outputs the DC power necessary to provide AC power whose amount is equal to the AC power required to drive the motor minus the predetermined limiting value.

When the AC power regenerated by the motor and returned to the AC power supply via the DC/AC converter, the DC link unit, and the AC/DC converter exceeds a predetermined limiting value, the energy control unit may perform control so that the energy storage unit stores the DC power obtained by converting AC power whose amount is equal to the AC power regenerated by the motor minus the predetermined limiting value.

The energy control unit may perform control so that the energy storage unit stores the DC power from the DC link unit when the motor is stopped or when the AC power necessary for driving the motor is not greater than a predetermined value.

According to a second mode of the present invention, there is provided a motor drive apparatus including: an AC/DC converter which converts AC power supplied from an AC power supply to DC power; a DC/AC converter which converts DC power to AC power for driving a motor or converts AC power regenerated by the motor back to DC power; a DC link unit which connects a DC side of the AC/DC converter to a DC side of the DC/AC converter and delivers the DC power from one to the other and vice versa; an energy storage unit which includes a plurality of different kinds of capacitors and which is connected to the DC link unit and stores the DC power supplied from the DC link unit or supplies the stored DC power to the DC link unit; an energy control unit which performs control so that the energy storage unit stores the DC power supplied from the DC link unit or supplies the stored DC power to the DC link unit; and a motor control unit which, based on a motor operation command for commanding operation of the motor, performs control so that the DC/AC converter outputs desired AC power.

DETAILED DESCRIPTION

First and second embodiments of a motor drive apparatus according to the present invention will be described below in which motors equal in number to the number of drive shafts for driving the feed and main axes of a machine tool are connected to the motor drive apparatus. In each embodiment, two motors are provided assuming that the number of drive shafts of the machine tool is two. However, it is to be understood that the number given here is only illustrative and is not restrictive of the invention.

Figure 1:
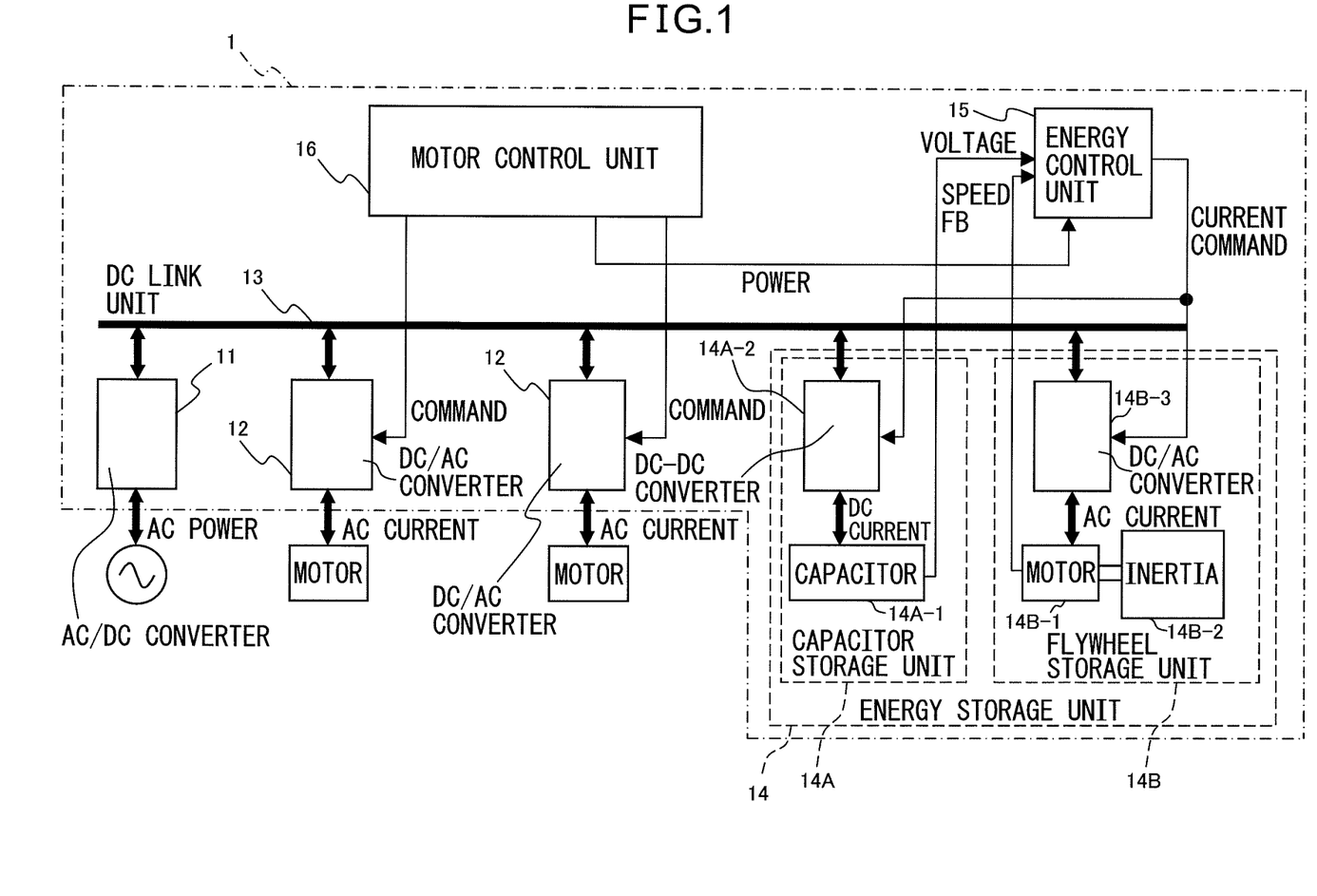
FIG. 1 is a block diagram showing a motor drive apparatus according to a first embodiment of the present invention.

FIG. 1 is a block diagram showing the motor drive apparatus according to the first embodiment of the present invention. In the illustrated example, two motors 2 are provided assuming that the number of drive shafts of the machine tool is two. The motor drive apparatus 1 according to the first embodiment of the present invention includes an AC/DC converter 11 which converts AC power supplied from an AC power supply 3 to DC power, DC/AC converters 12 which convert DC power to AC power for driving the respective motors 2 or convert AC power regenerated by the respective motors 2 back to DC power, a DC link unit 13 which connects the DC side of the AC/DC converter 11 to the DC side of each DC/AC converter 12 and delivers the DC power from one to the other and vice versa, an energy storage unit 14 which includes at least one capacitor storage unit 14A and at least one flywheel storage unit 14B each of which is connected to the DC link unit 13 and stores the DC power supplied from the DC link unit 13 or supplies the stored DC power to the DC link unit 13, an energy control unit 15 which performs control so that the energy storage unit 14 stores the DC power supplied from the DC link unit 13 or supplies the stored DC power to the DC link unit 13, and a motor control unit 16 which, based on a motor operation command for commanding the operation of each motor 2, controls the AC power output of the DC/AC converter 12.

The AC/DC converter 11 is constructed, for example, from a PWM converter or a diode rectifier converter constructed in the form of a bridge circuit using power semiconductor devices and diodes connected in reverse parallel with the respective power semiconductor devices. When supplying power to the motor 2, that is, during the powering operation of the motor 2, the AC/DC converter 11 converts the AC voltage supplied from the three-phase AC utility power supply to a DC voltage by full rectification using six diodes, and during power regeneration, the AC/DC converter 11 controls the switching of six power semiconductor devices by PWM control so that the regenerated AC power flows back into the AC power supply.

The DC/AC converters 12 are each constructed, for example, from a bridge circuit using power semiconductor devices and diodes connected in reverse parallel with the respective power semiconductor devices. Then, the DC voltage is converted to an AC voltage of a desired waveform and frequency by ON/OFF control (for example, PWM control) of the power semiconductor devices in accordance with a command from the motor control unit 16. The DC/AC converter 12 supplies the AC power output to the motor 2. The switching operation of the DC/AC converter 12 is controlled by the motor control unit 16. That is, the motor control unit 16 creates a command for causing the motor 2 to operate with the desired speed (acceleration, deceleration, constant speed, stopping, etc.), torque, or rotor position, and issues ON/OFF commands to the respective power semiconductor devices in the DC/AC converter 12 so that the DC/AC converter 12 outputs the AC power having the waveform and frequency necessary for the motor 2 to operate in accordance with the operation command. The AC power output from the DC/AC converter 12 is supplied to the motor 2 which is thus driven for rotation.

The DC link unit 13, which connects the DC side of the AC/DC converter 11 to the DC side of each DC/AC converter 12 and delivers the DC power from one to the other and vice versa, includes a smoothing capacitor (not shown) for smoothing the DC voltage output from the AC/DC converter 11 or the DC/AC converter 12.

The energy storage unit 14 includes at least one capacitor storage unit 14A and at least one flywheel storage unit 14B. As an example, in FIG. 1, the energy storage unit 14 is shown as including one capacitor storage unit 14A and one flywheel storage unit 14B.

The capacitor storage unit 14A includes a large-capacitance capacitor 14A-1 and a DC-DC converter 14A-2. The amount of DC power to be stored or output by the capacitor storage unit 14A is controlled by the energy control unit 15. More specifically, the energy control unit 15 supplies the DC-DC converter 14A-2 with a command for controlling the amount of DC power to be stored (charged) into or output (discharged) from the capacitor storage unit 14A. If the command received from the energy control unit 15 is one that commands the capacitor storage unit 14A to output (discharge) the DC power, the DC-DC converter 14A-2 operates so as to make the DC voltage at the side connected to the capacitor 14A-1 higher than the DC voltage at the side connected to the DC link unit 13 so that the energy stored in the capacitor 14A-1 flows to the DC link unit 13; on the other hand, if the command received from the energy control unit 15 is one that commands the capacitor storage unit 14A to store the DC power (charging), the DC-DC converter 14A-2 operates so as to make the DC voltage at the side connected to the capacitor 14A-1 lower than the DC voltage at the side connected to the DC link unit 13 so that the energy from the DC link unit 13 flows to the capacitor 14A-1 and the energy is thus stored in the capacitor 14A-1. With this arrangement, during acceleration of the motor 2, not only the energy from the AC power supply 3 but also the energy stored in the capacitor storage unit 14A is supplied to the motor 2 and used as the power to accelerate the motor 2, and during deceleration of the motor 2, the regenerative energy from the motor 2 flows into the capacitor storage unit 14A for storing therein. The energy stored in the capacitor storage unit 14A is reused when accelerating the motor 2.

The flywheel storage unit 14B includes an inertia rotating motor 14B-1, an inertia 14B-2, and a DC/AC converter 14B-3. The amount of DC power to be stored or output by the flywheel storage unit 14B is controlled by the energy control unit 15. More specifically, the energy control unit 15 supplies the DC/AC converter 14B-3 with a command for controlling the amount of DC power to be stored or output by the flywheel storage unit 14B. If the command received from the energy control unit 15 is one that commands the flywheel storage unit 14B to store the DC power, the DC/AC converter 14B-3 performs reverse conversion from DC to AC so that the energy from the DC link unit 13 flows to the inertia rotating motor 14B-1, thereby causing the inertia rotating motor 14B-1 mounted with the inertia 14B-2 to rotate. In this way, the supplied power energy is stored as the rotational energy of the inertia 14B-2. On the other hand, if the command received from the energy control unit 15 is one that commands the flywheel storage unit 14B to output the DC power, the DC/AC converter 14B-3 performs forward conversion from AC to DC so that the rotational energy stored in the inertia 14B-2 is converted to electrical energy through the inertia rotating motor 14B-1 and through the DC/AC converter 14B-3. With this arrangement, during acceleration of the motor 2, not only the energy from the AC power supply 3 but also the energy stored in the inertia storage unit 14B is supplied to the motor 2 and used as the power to accelerate the motor 2, and during deceleration of the motor 2, the regenerative energy from the motor 2 flows into the flywheel storage unit 14B for storing therein. The energy stored in the flywheel storage unit 14B is reused when accelerating the motor 2.

As described above, according to the motor drive apparatus 1 of the first embodiment of the invention, the energy storage unit 14 includes the capacitor storage unit 14A and the flywheel storage unit 14B. The capacitor storage unit 14A and the flywheel storage unit 14B are both controlled by the energy control unit 15.

The energy control unit 15 and the motor control unit 16 each include, for example, a processor capable of arithmetic, logic, and decision-making operations. When controlling the operation of the motor 2, the motor control unit 2 must detect such quantities as the AC current flowing into and out of the motor 2, the rotational speed of the motor 2, the input/output voltages of the DC/AC converter 12, and the AC output voltage, and use these detected quantities for processing, but the detectors and sensors used for such purposes are not shown in FIG. 1. On the other hand, the energy control unit 15 detects quantities such as the DC voltage of the capacitor 14A-1 from the capacitor storage unit 14A and the rotational speed of the inertia rotating motor 14B-1 from the flywheel storage unit 14B, and uses these detected quantities for processing.

Next, the operation of the energy control unit 15 will be described.

According to the first embodiment of the invention, the capacitor storage unit 14A and the flywheel storage unit 14B are used in combination to implement the energy storage unit 14 for storing and supplying the DC power. For example, the capacitor storage unit 14A has an advantage in terms of the efficiency of energy utilization or the speed of supply. However, the flywheel storage unit 14B is advantageous when it comes to the amount of energy that can be stored. Therefore, in the first embodiment of the invention, in view of these characteristics of the capacitor storage unit 14A and the flywheel storage unit 14B, either the capacitor storage unit 14A or the flywheel storage unit 14B or both are used to store the DC power or supply the stored DC power according to the operating condition or operating situation of the motor. That is, the energy control unit 15 performs control so that only the capacitor storage unit 14A or only the flywheel storage unit 14B or both the capacitor storage unit 14A and the flywheel storage unit 14B are used to supply the DC power to the DC link unit 13 (discharging) or store the DC power from the DC link unit 13 (charging), in accordance with the motor operation command received from the motor control unit 16 or in view of the characteristics, such as the storable amount of energy or the charge/discharge speed, of the capacitor storage unit 14A and the flywheel storage unit 14B.

The energy control unit 15 sets a power supply ratio between the capacitor storage unit 14A and the flywheel storage unit 14B for the DC power that the energy storage unit 14 supplies to the DC link unit 13 during the acceleration control of the motor 2 performed by the motor control unit 16, and also sets a power storage ratio between the capacitor storage unit 14A and the flywheel storage unit 14B for the DC power that the energy storage unit 14 stores from the DC link unit 13 during the deceleration control of the motor 2 performed by the motor control unit 16. For example, when either the capacitor storage unit 14A or the flywheel storage unit 14B is to be set inoperative (deactivated), the power supply ratio or the power storage ratio is set to zero (0) for the storage unit chosen to be set inoperative (deactivated). Both the power supply ratio and the power storage ratio are variable, each being varied as a function of time according to the type of control to be performed, and are used for the generation of PWM control signals for controlling the switching operations of the DC-DC converter 14A-2 in the capacitor storage unit 14A and the DC/AC converter 14B-3 in the flywheel storage unit 14B, respectively.

When designing the motor drive apparatus 1, first the storable amount of energy and the maximum output of the energy storage unit 14 are determined based on such factors as the driving condition of the motor 2 as the load, the power peak allowed for the AC power supply 3 to which the motor drive apparatus 1 is connected, or the power peak desired to be set as a specification of the motor drive apparatus 1. Once the storable amount of energy and the maximum output of the energy storage unit 14 are determined, the power storage ratio between the capacitor storage unit 14A and the flywheel storage unit 14B is determined by taking account for the installation space and cost of the energy storage unit 14 as needed. When the power storage ratio between the capacitor storage unit 14A and the flywheel storage unit 14B is determined, the capacitor size of the capacitor storage unit 14A and the motor inertia of the flywheel storage unit 14B are determined in accordance with the following equations.

When the energy that the capacitor storage unit 14A stores or supplies is denoted by $J_A$ [J], the capacitance of the capacitor 14A-1 by C [F], the upper limit of the charge voltage of the capacitor 14A-1 by $V_1$ [V], and the lower limit of the charge voltage of the capacitor 14A-1 by $V_2$ [V], the relation of equation 1 holds, from which the capacitance C [F] of the capacitor 14A-1 can be determined.

$$J_A = \tfrac{1}{2}C(V_1^2 - V_2^2) \tag{1}$$

Further, when the voltage of the capacitor 14A-1 is denoted by V [V], and the current flowing into and out of the capacitor 14A-1 is denoted by I [A], the output $W_A$ [W] of the capacitor storage unit 14A can be determined from the following equation (2).

$$W_A = VI \tag{2}$$

On the other hand, when the energy that the flywheel storage unit 14B stores or supplies is denoted by $J_B$ [J], the value of the inertia 14B-2 by I [kgm²], the upper limit of the angular velocity of the motor 2 by $\omega_1$ [rad/s], and the lower limit of the angular velocity of the motor 2 by $\omega_2$ [rad/s], the relation of equation 3 holds, from which the value I [kgm²] of the inertia 14B-2 can be determined.

$$J_B = \tfrac{1}{2}I(\omega_1^2 - \omega_2^2) \tag{3}$$

The value of the inertia 14B-2 here also includes the inertia possessed by the inertia rotating motor 14B-1. In the example of FIG. 1, the inertia 14B-2 is shown as being connected to the rotation axis of the inertia rotating motor 14B-1. However, the inertia 14B-2 may be the inertia that the rotation axis of the inertia rotating motor 14B-1 itself possesses, rather than providing the inertia 14B-2 as a separate member from the inertia rotating motor 14B-1.

When the torque of the motor 2 is denoted by T [Nm], and the angular velocity of the motor 2 is denoted by $\omega$ [rad/s], the output $W_B$ [W] of the flywheel storage unit 14B can be determined from the following equation (4).

$$W_B = T\omega \tag{4}$$

Next, the operation of the motor drive apparatus 1 according to the first embodiment of the invention will be described by way of specific examples.

Figure 2A:
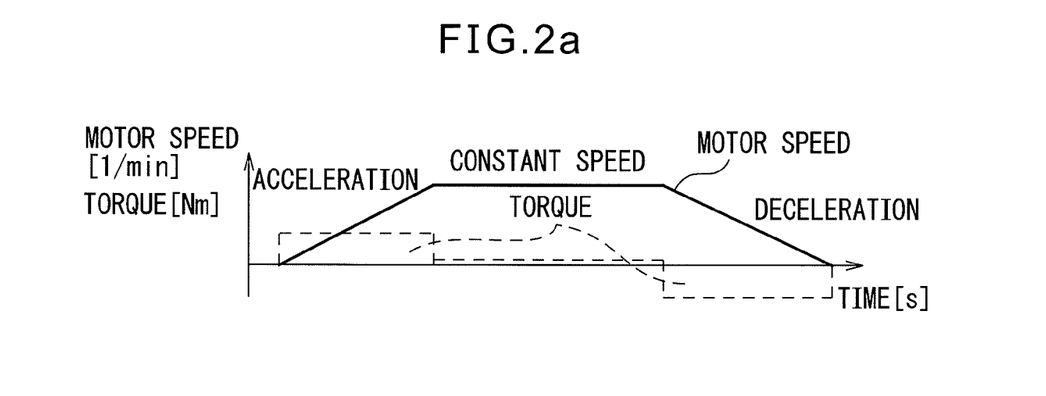
FIGS. 2a and 2b are diagrams illustrating a first specific example of the operation of the motor drive apparatus according to the first embodiment of the invention.
Figure 2B:
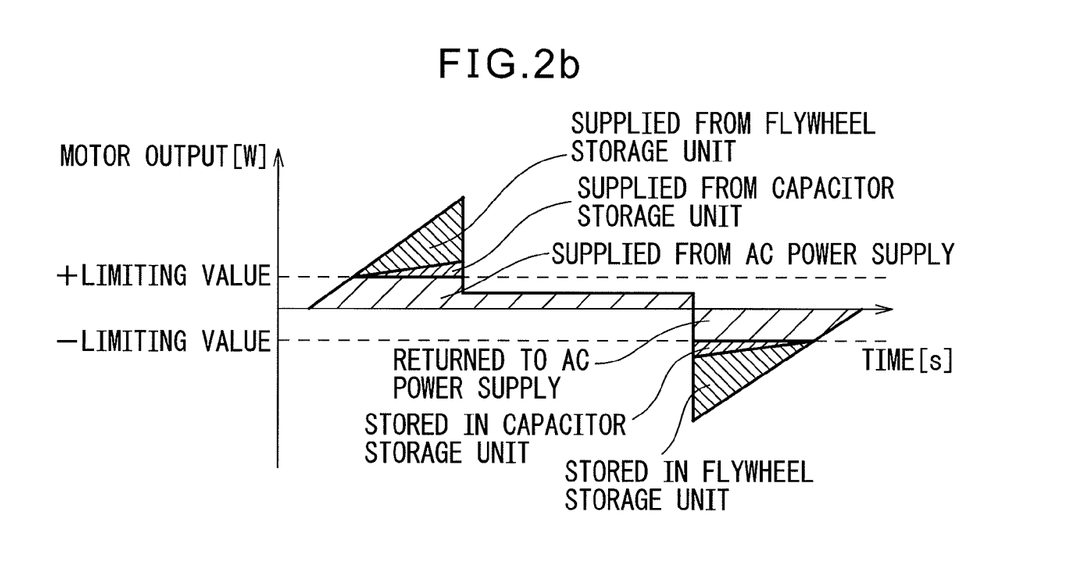

FIGS. 2a and 2b are diagrams illustrating a first specific example of the operation of the motor drive apparatus 1 according to the first embodiment of the invention. In the first specific example, the power supply ratio and the power storage ratio between the capacitor storage unit 14A and the flywheel storage unit 14B are both set to 1:4 and, based on the thus set power supply ratio and power storage ratio, the energy control unit 15 controls the energy storage unit 14. The power supply ratio and the power storage ratio used here are determined in accordance with the equations (1) to (4) as described above.

As illustrated in FIG. 2a, consider the case where, under the control of the motor control unit 16, the motor 2 is first accelerated, and then decelerated after being driven at a constant speed for a predetermined period of time. As can be seen from FIG. 2a, positive torque is produced when accelerating the motor 2, and negative torque is produced when decelerating the motor 2.

When the AC power that is supplied from the AC power supply 3 to the motor 2 via the AC/DC converter 11, the DC link unit 13, and the DC/AC converter 12 exceeds a predetermined limiting value, the energy control unit 15 performs control so that the energy storage unit 14 outputs the DC power necessary to provide AC power whose amount is equal to the AC power required to drive the motor 2 minus the predetermined limiting value, in particular, so that the capacitor storage unit 14A and the flywheel storage unit 14B output the DC power in accordance with the predetermined power supply ratio of 1:4. As illustrated in FIG. 2b, the motor output continues to increase during the acceleration control period of the motor 2. However, the energy control unit 15 does not activate the energy storage unit 14 until the motor output reaches the predetermined limiting value; that is, power is supplied only from the AC power supply 3 during this period.

When the motor output reaches the predetermined limiting value during the acceleration control period of the motor 2, the energy control unit 15 controls the DC-DC converter 14A-2 in the capacitor storage unit 14A and the DC/AC converter 14B-3 in the flywheel storage unit 14B so that power is supplied from the capacitor storage unit 14A and the flywheel storage unit 14B in the ratio of 1:4, in addition to the power from the AC power supply 3.

During the constant speed control period of the motor 2, the energy storage unit 14 is deactivated under the control of the energy control unit 15, because the motor 2 can be driven during that period with much less power than that required during the acceleration or deceleration control period.

When the motor 2 thereafter enters the deceleration control period, regenerative power is produced by the motor 2. When the AC power regenerated by the motor 2 and returned to the AC power supply 3 via the DC/AC converter 12, the DC link unit 13, and the AC/DC converter 11 exceeds a predetermined limiting value, the energy control unit 15 performs control so that the energy storage unit 14 stores the DC power obtained by converting AC power whose amount is equal to the AC power regenerated by the motor 2 minus the predetermined limiting value, in particular, so that the capacitor storage unit 14A and the flywheel storage unit 14B stores the DC power in accordance with the predetermined power storage ratio of 1:4. That is, the power not exceeding the predetermined limiting value is returned to the AC power supply 3 but, for the power exceeding the predetermined limiting value, the energy control unit 15 controls the DC-DC converter 14A-2 in the capacitor storage unit 14A and the DC/AC converter 14B-3 in the flywheel storage unit 14B so that the capacitor storage unit 14A and the flywheel storage unit 14B store the regenerated power in accordance with the predetermined power storage ratio of 1:4. After the regenerated power has been stored until reaching the predetermined limiting value, the energy storage unit 14 is deactivated under the control of the energy control unit 15. Thereafter, all the regenerated power is returned to the AC power supply 3.

Figure 3A:
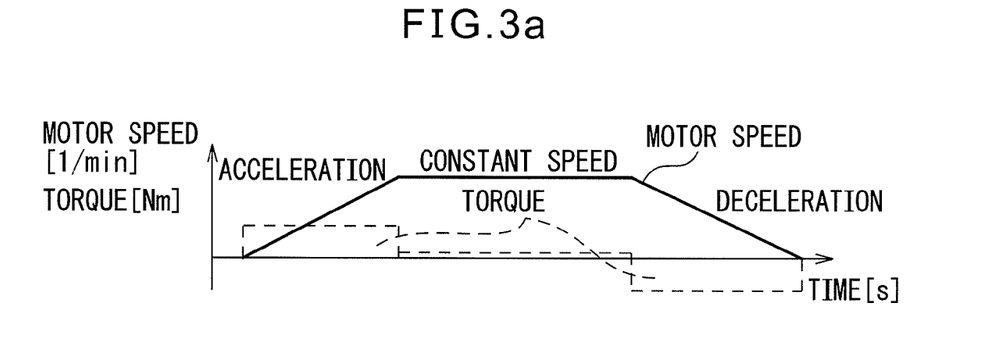
FIGS. 3a and 3b are diagrams illustrating a second specific example of the operation of the motor drive apparatus according to the first embodiment of the invention.
Figure 3B:
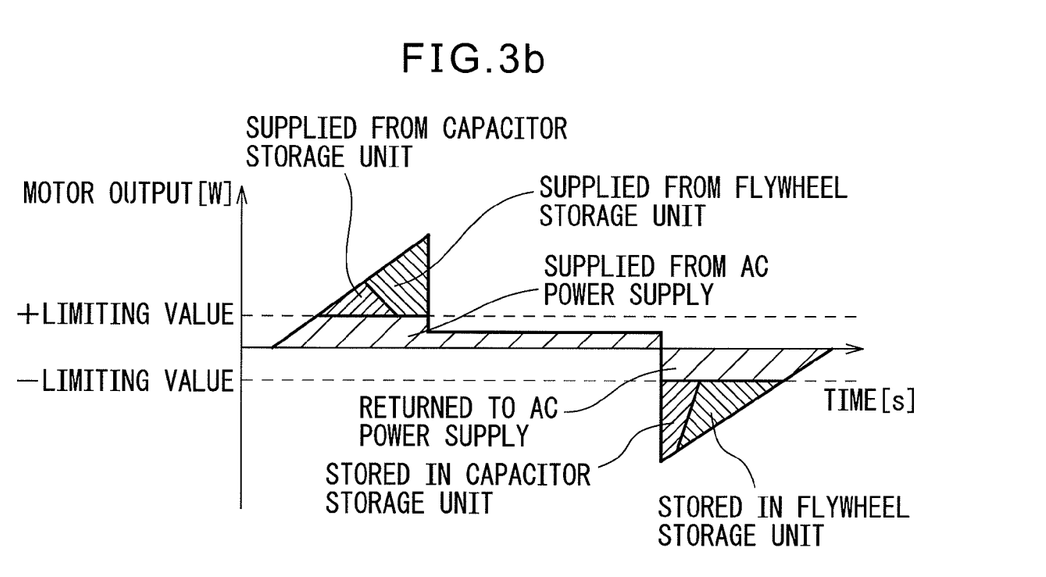

FIGS. 3a and 3b are diagrams illustrating a second specific example of the operation of the motor drive apparatus 1 according to the first embodiment of the invention. In the second specific example, only the capacitor storage unit 14A is put into operation when the supply of the DC power is started as well as when the storage of the DC power is started. This is to take advantage of the characteristic that the large-capacitance capacitor can be quickly charged and discharged, the characteristic that the efficiency of energy utilization of the capacitor storage unit is higher because the amount of loss that occurs in the capacitor storage unit when storing or supplying the energy is smaller than the amount of loss that occurs in the flywheel storage unit, and the characteristic that the flywheel storage unit can store a larger amount of energy than the capacitor storage unit.

As illustrated in FIG. 3a, consider the case where, under the control of the motor control unit 16, the motor 2 is first accelerated, and then decelerated after being driven at a constant speed for a predetermined period of time. As can be seen from FIG. 3a, positive torque is produced when accelerating the motor 2, and negative torque is produced when decelerating the motor 2.

When the AC power supplied from the AC power supply 3 to the motor 2 via the AC/DC converter 11, the DC link unit 13, and the DC/AC converter 12 exceeds a predetermined limiting value, the energy control unit 15 performs control so that the energy storage unit 14 outputs the DC power necessary to provide AC power whose amount is equal to the AC power required to drive the motor 2 minus the predetermined limiting value. As illustrated in FIG. 3b, the motor output continues to increase during the acceleration control period of the motor 2. However, the energy control unit 15 does not activate the energy storage unit 14 until the motor output reaches the predetermined limiting value; i.e., power is supplied only from the AC power supply 3 during this period.

When the motor output reaches the predetermined limiting value during the acceleration control period of the motor 2, the energy control unit 15 controls the DC-DC converter 14A-2 in the capacitor storage unit 14A and the DC/AC converter 14B-3 in the flywheel storage unit 14B so that power is supplied from the capacitor storage unit 14A, in addition to the power from the AC power supply 3.

During the constant speed control period of the motor 2, the energy control unit 15 controls the DC-DC converter 14A-2 in the capacitor storage unit 14A and the DC/AC converter 14B-3 in the flywheel storage unit 14B so that the energy storage unit 14 is deactivated throughout that period, because the motor 2 can be driven during that period with much less power than that required during the acceleration or deceleration control period. When the motor output reaches the predetermined limiting value during the acceleration control period of the motor 2, the energy control unit 15 controls the DC-DC converter 14A-2 in the capacitor storage unit 14A so that power is supplied from the capacitor storage unit 14A, in addition to the power from the AC power supply 3. As the supply of power from the capacitor storage unit 14A progresses, the power stored in the capacitor storage unit 14A approaches exhaustion; therefore, upon detecting that the charged voltage of the capacitor 14A-1 has reached its lower limit value $V_2$, the energy control unit 15 starts to supply power from the flywheel storage unit 14B by controlling the DC/AC converter 14B-3 in the flywheel storage unit 14B. In the illustrated example, the supply source of the DC power to the DC link unit 13 is gradually switched from the capacitor storage unit 14A to the flywheel storage unit 14B by changing the power supply ratio when starting the supply of power from the flywheel storage unit 14B so as to gradually reduce the amount of DC power to be supplied from the capacitor storage unit 14A, as illustrated in FIG. 3b. Alternatively, the supply of the DC power from the capacitor storage unit 14A may be stopped when the supply of power from the flywheel storage unit 14B is started.

During the constant speed control period of the motor 2, the energy control unit 15 controls the DC-DC converter 14A-2 in the capacitor storage unit 14A and the DC/AC converter 14B-3 in the flywheel storage unit 14B so that the energy storage unit 14 is deactivated throughout that period, because the motor 2 can be driven during that period with much less power than that required during the acceleration or deceleration control period.

When the motor 2 thereafter enters the deceleration control period, regenerative power is produced by the motor 2. When the AC power regenerated by the motor 2 and returned to the AC power supply 3 via the DC/AC converter 12, the DC link unit 13, and the AC/DC converter 11 exceeds a predetermined limiting value, the energy control unit 15 performs control so that the capacitor storage unit 14A stores the DC power obtained by converting AC power whose amount is equal to the AC power regenerated by the motor 2 minus the predetermined limiting value. That is, the power not exceeding the predetermined limiting value is returned to the AC power supply 3. However, for the power exceeding the predetermined limiting value, the energy control unit 15 controls the DC-DC converter 14A-2 in the capacitor storage unit 14A so that the capacitor storage unit 14A stores the regenerated power. As the DC power is stored in the capacitor storage unit 14A, the amount of DC power stored in the capacitor storage unit 14A approaches the upper limit of the storable amount; therefore, upon detecting that the charged voltage of the capacitor 14A-1 has reached its upper limit value $V_1$, the energy control unit 15 starts to store power in the flywheel storage unit 14B by controlling the DC/AC converter 14B-3 in the flywheel storage unit 14B. In the illustrated example, the storage unit for storing the DC power from the DC link unit 13 is gradually switched from the capacitor storage unit 14A to the flywheel storage unit 14B by changing the power storage ratio when starting to store the power in the flywheel storage unit 14B so as to gradually reduce the amount of DC power to be stored in the capacitor storage unit 14A, as illustrated in FIG. 3b. Alternatively, the storage of the DC power by the capacitor storage unit 14A may be stopped when the storage of DC power by the flywheel storage unit 14B is started. After the regenerated power has been stored until reaching the predetermined limiting value, the energy control unit 15 deactivates the energy storage unit 14 by controlling the DC-DC converter 14A-2 in the capacitor storage unit 14A and the DC/AC converter 14B-3 in the flywheel storage unit 14B. Thereafter, all the regenerated power is returned to the AC power supply 3.

As described above, in the second specific example, provisions are made to use the flywheel storage unit 14B when the energy supply from the capacitor storage unit 14A comes close to being exhausted or when the capacitor storage unit 14A becomes no longer able to store the power being regenerated by the motor 2. More specifically, the energy control unit 15 performs control so that the DC power that the energy storage unit 14 supplies to the DC link unit 13 is supplied only from the capacitor storage unit 14A when the amount of DC power is not larger than a predetermined amount of power but, when the amount of DC power is larger than the predetermined amount of power, the DC power is supplied only from the flywheel storage unit 14B or from both the capacitor storage unit 14A and the flywheel storage unit 14B. Further, the energy control unit 15 performs control so that the DC power that the energy storage unit 14 stores from the DC link unit 13 is stored only in the capacitor storage unit 14A when the amount of DC power is not larger than a predetermined amount or power but, when the amount of DC power is larger than the predetermined amount of power, the DC power is stored only in the flywheel storage unit 14B or in both the capacitor storage unit 14A and the flywheel storage unit 14B.

Figure 4A:
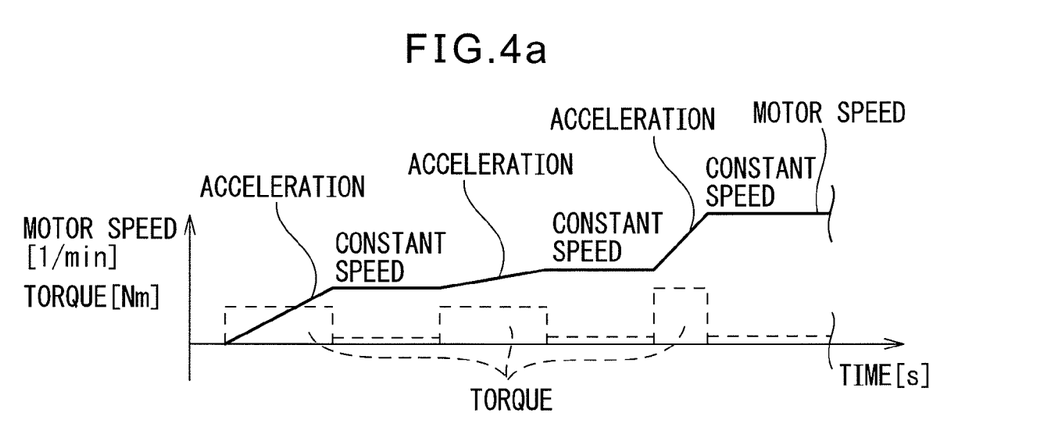
FIGS. 4a and 4b are diagrams illustrating a third specific example of the operation of the motor drive apparatus according to the first embodiment of the invention.
Figure 4B:
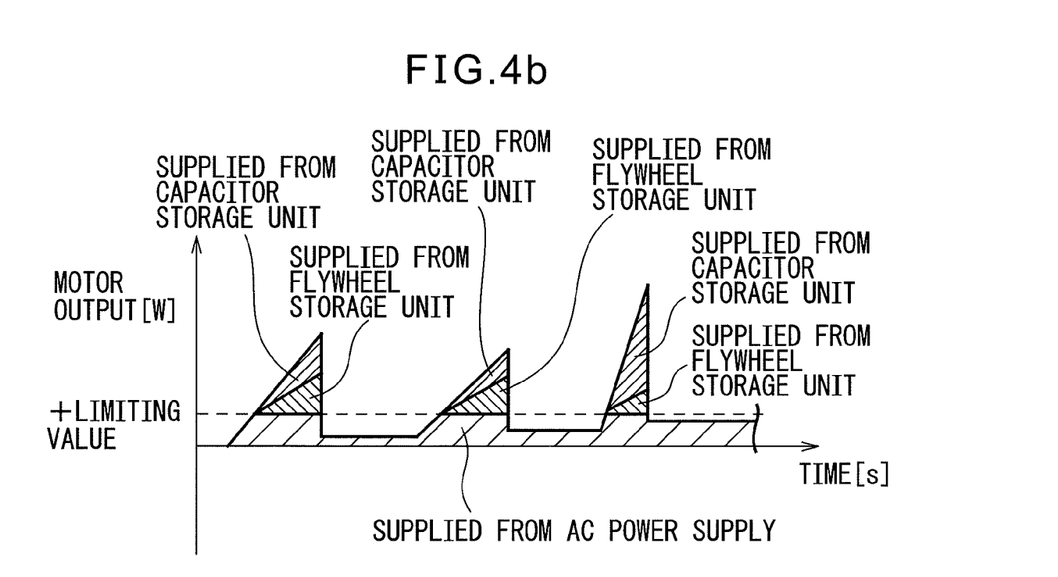

FIGS. 4a and 4b are diagrams illustrating a third specific example of the operation of the motor drive apparatus 1 according to the first embodiment of the invention. In the third specific example, when the motor 2 as the load exhibits rapid load variations, and there arises a need to quickly supply or store power in order to suppress power peaks of the AC power supply, the capacitor storage unit is preferentially used. The AC power for driving the motor 2 reaches a peak value when accelerating or decelerating the motor 2; if a delay occurs in supplying power from the energy storage unit 14 or in storing power in the energy storage unit 14, the energy storage unit 14 will be requested to supply more power or store more power than normally expected. Since the capacitor storage unit 14A is superior to the flywheel storage unit 14B in terms of the speed of storage or supply of the drive power, as earlier described, the capacitor storage unit 14A is used in the energy storage unit 14 when rapid storage or supply of the drive power is demanded.

Consider the case where, under the control of the motor control unit 16, the motor 2 is first accelerated, then driven at a constant speed, and then further accelerated, as illustrated in FIG. 4a. As can be seen from FIG. 4a, positive torque is produced when accelerating the motor 2.

When the AC power supplied from the AC power supply 3 to the motor 2 via the AC/DC converter 11, the DC link unit 13, and the DC/AC converter 12 exceeds a predetermined limiting value, the energy control unit 15 performs control so that the energy storage unit 14 outputs the DC power necessary to provide AC power whose amount is equal to the AC power required to drive the motor 2 minus the predetermined limiting value. As illustrated in FIG. 4b, the motor output continues to increase during the acceleration control period of the motor 2, but the energy control unit 15 does not activate the energy storage unit 14 until the motor output reaches the predetermined limiting value; that is, power is supplied only from the AC power supply 3 during this period.

When the motor output reaches the predetermined limiting value during the acceleration control period of the motor 2, the energy control unit 15 controls the DC-DC converter 14A-2 in the capacitor storage unit 14A and the DC/AC converter 14B-3 in the flywheel storage unit 14B so that the stored power is supplied only from the capacitor storage unit 14A or from the flywheel storage unit 14B or from both the capacitor storage unit 14A and the flywheel storage unit 14B, in addition to the power from the AC power supply 3. More specifically, the energy control unit 15 controls the DC-DC converter 14A-2 in the capacitor storage unit 14A and the DC/AC converter 14B-3 in the flywheel storage unit 14B so that, when the rate of increase of the DC power that the energy storage unit 14 supplies to the DC link unit 13 is not greater than a predetermined value, the DC power is supplied only from the flywheel storage unit 14B. However, when the rate of increase of the DC power that the energy storage unit 14 supplies to the DC link unit 13 is greater than the predetermined value, the DC power is supplied only from the capacitor storage unit 14A or from both the capacitor storage unit 14A and the flywheel storage unit 14B. While the illustrated example shows the case where the power is supplied from the energy storage unit 14 during the acceleration control and constant speed control of the motor 2, essentially the same description applies to the case where the power regenerated by the motor 2 is stored in the energy storage unit 14. That is, when the rate of increase of the DC power that the energy storage unit 14 stores from the DC link unit 13 is not greater than a predetermined value, the energy control unit 15 controls the DC/AC converter 14B-3 in the flywheel storage unit 14B so that the DC power is stored only in the flywheel storage unit 14B. However, when the rate of increase of the DC power that the energy storage unit 14 stores from the DC link unit 13 is greater than the predetermined value, the energy control unit 15 controls the DC-DC converter 14A-2 in the capacitor storage unit 14A and the DC/AC converter 14B-3 in the flywheel storage unit 14B so that the DC power is stored only in the capacitor storage unit 14A or in both the capacitor storage unit 14A and the flywheel storage unit 14B. After the regenerated power has been stored until reaching the predetermined limiting value, the energy control unit 15 deactivates the energy storage unit 14 by controlling the DC-DC converter 14A-2 in the capacitor storage unit 14A and the DC/AC converter 14B-3 in the flywheel storage unit 14B. Thereafter, all the regenerated power is returned to the AC power supply 3.

As described above, the energy control unit 15 performs control so that only the capacitor storage unit 14A or only the flywheel storage unit 14B or both the capacitor storage unit 14A and the flywheel storage unit 14B supply the DC current to the DC link unit 13 (discharging) or store the DC current from the DC link unit 13 (charging) in accordance with the motor operation command received from the motor control unit 16 or in view of the characteristics, such as the storable amount of energy or the charge/discharge speed, of the capacitor storage unit 14A and the flywheel storage unit 14B. The first to third specific examples described above with reference to FIGS. 2a and 2b, 3a and 3b, and 4a and 4b, respectively, are only illustrative, and it is to be understood that in any operating situations other than those described above for the motor drive apparatus 1, the energy control unit 15 performs control in like manner according to the situation so that only the capacitor storage unit 14A or only the flywheel storage unit 14B or both the capacitor storage unit 14A and the flywheel storage unit 14B supply the DC current to the DC link unit 13 (discharging) or store the DC current from the DC link unit 13 (charging). For example, the first to third specific examples described above may be used in any suitable combination.

When power is turned on to the motor drive apparatus 1, if the energy storage unit 14 is not yet charged, and the driving condition is such that the amount of power generated by the motor 2 is small, the energy storage unit 14 may only be able to store a small amount of power. In such cases, the small amount of power stored in the energy storage unit 14 may not be sufficient to supply all the drive power that will become necessary to subsequently accelerate the motor 2; as a result, the amount of power supplied from the AC power supply 3 increases, producing a large power peak. Therefore, provisions must be made so that the energy storage unit 14 can supply the necessary power to suppress the power peak of the AC power supply 3 even when the driving condition is such that the energy storage unit 14 is unable to store enough supply energy. In view of this, when the motor 2 is stopped or when the power necessary for driving the motor is not greater than a given value, it is preferable to store power in the energy storage unit 14 while limiting the current. That is, the energy control unit 15 controls the DC-DC converter 14A-2 in the capacitor storage unit 14A and the DC/AC converter 14B-3 in the flywheel storage unit 14B so that the energy storage unit 14 stores the DC power from the DC link unit 13 when the motor 2 is stopped or when the AC power necessary for driving the motor 2 is not greater than a predetermined value.

Next, the motor drive apparatus according to the second embodiment of the present invention will be described. The second embodiment of the present invention differs from the first embodiment described with reference to FIGS. 1 to 4 in that the capacitor storage unit and flywheel storage unit constituting the energy storage unit are replaced by a plurality of capacitor storage units each constructed from a different kind of capacitor.

Figure 5:
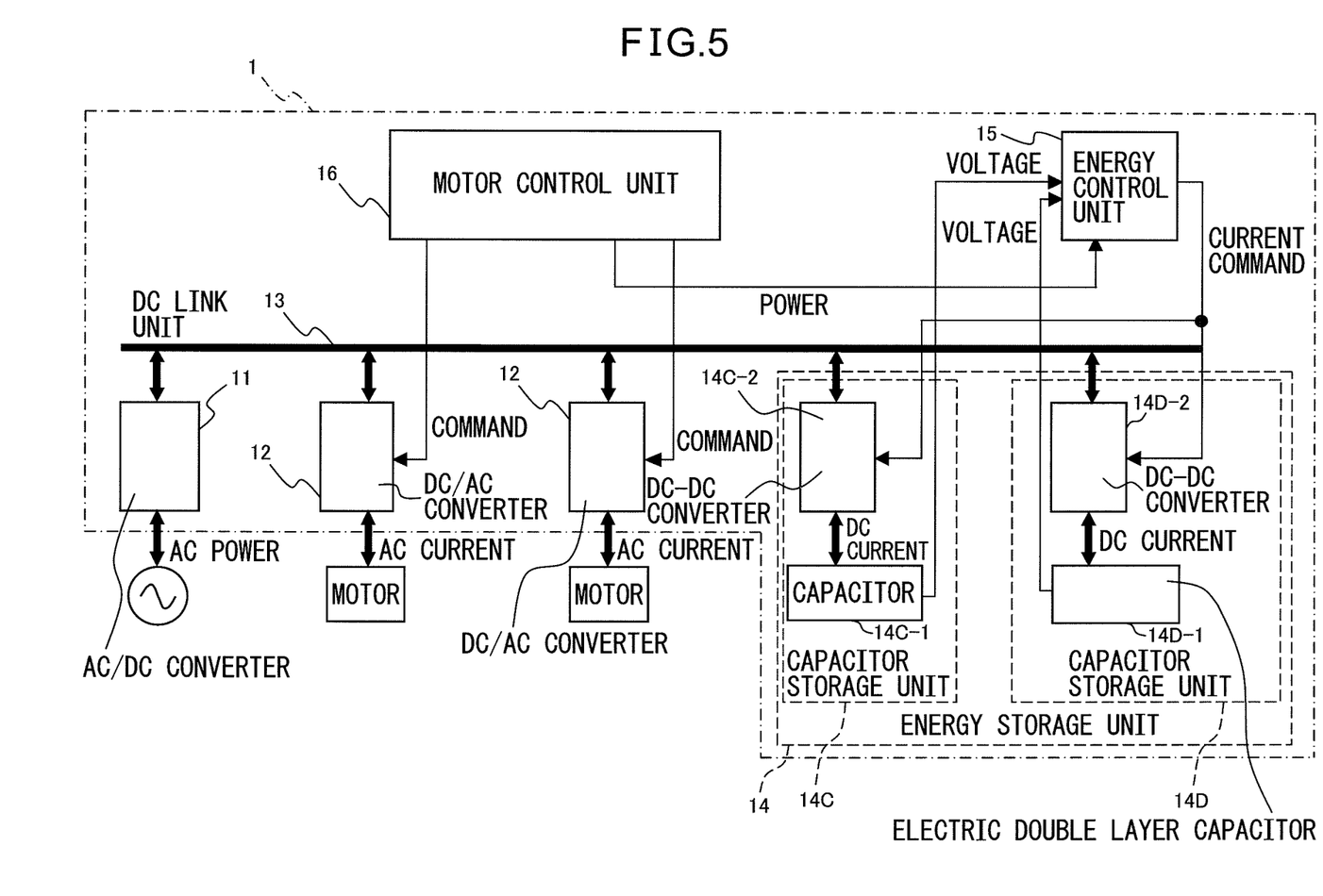
FIG. 5 is a block diagram showing a motor drive apparatus according to a second embodiment of the present invention.

FIG. 5 is a block diagram showing the motor drive apparatus according to the second embodiment of the present invention. In the illustrated example, two motors 2 are provided assuming that the number of drive shafts of the machine tool is two.

The motor drive apparatus 1 according to the second embodiment of the present invention includes an AC/DC converter 11 which converts AC power supplied from an AC power supply 3 to DC power, DC/AC converters 12 which convert DC power to AC power for driving the motors 2 or convert AC power regenerated by the motors 2 back to DC power, a DC link unit 13 which connects the DC side of the AC/DC converter 11 to the DC side of each DC/AC converter 12 and delivers the DC power from one to the other and vice versa, an energy storage unit 14 which includes capacitor storage units 14C and 14D, each constructed from a different kind of capacitor and connected to the DC link unit 13, for storing the DC power supplied from the DC link unit 13 or for supplying the stored DC power to the DC link unit 13, an energy control unit 15 which performs control so that the energy storage unit 14 stores the DC power supplied from the DC link unit 13 or supplies the stored DC power to the DC link unit 13, and a motor control unit 16 which, based on a motor operation command for commanding the operation of each motor 2, controls the AC power output of the DC/AC converter 12.

That is, while, in the first embodiment shown in FIG. 1, the energy storage unit 14 has been described as including at least one capacitor storage unit 14A and at least one flywheel storage unit 14B, the energy storage unit 14 according to the second embodiment shown in FIG. 5 is constructed from two different capacitor storage units 14C and 14D each incorporating a different kind of capacitor. Since the rated voltage is different for each kind of capacitor, providing different capacitor storage units each incorporating a DC-DC converter is an effective means in view of the fact that the energy control unit 15 performs control within an allowable voltage range which differs for each kind of capacitor. In the illustrated example, two capacitor storage units are provided. However, this is only illustrative and not restrictive, the only requirement being that two or more capacitor storage units be provided. The other circuit component elements are the same as those shown in FIG. 1; therefore, the same circuit component elements are designated by the same reference numerals, and the details of such circuit component elements will not be further described herein. The capacitor storage units 14C and 14D will be described below.

Examples of the capacitors (power storage devices) used in the respective capacitor storage units 14C and 14D include an electrolytic capacitor, an electric double layer capacitor, a lithium-ion capacitor, a next-generation large-capacitance capacitor, etc. In the second embodiment shown in FIG. 5, the capacitor used in the capacitor storage unit 14C is constructed from an electrolytic capacitor 14C-1, and the capacitor used in the capacitor storage unit 14D is constructed from an electric double layer capacitor 14D-1.

A DC-DC converter 14C-2 is connected between the DC link unit 13 and the electrolytic capacitor 14C-1 used in the capacitor storage unit 14C, and a DC-DC converter 14D-2 is connected between the DC link unit 13 and the electric double layer capacitor 14D-1 used in the capacitor storage unit 14D. The amount of DC power to be stored or output by each of the capacitor storage units 14C and 14D is controlled by the energy control unit 15. More specifically, the energy control unit 15 supplies the DC-DC converter 14C-2 with a command for controlling the amount of DC power to be stored (charged) into or output (discharged) from the capacitor storage unit 14C. If the received command is one that commands the electrolytic capacitor 14C-1 to output (discharge) the DC power, the DC-DC converter 14C-2 operates so as to make the DC voltage at the side connected to the electrolytic capacitor 14C-1 higher than the DC voltage at the side connected to the DC link unit 13 so that the energy stored in the electrolytic capacitor 14C-1 flows to the DC link unit 13; on the other hand, if the received command is one that commands the capacitor storage unit 14C to store the DC power (charging), the DC-DC converter 14C-2 operates so as to make the DC voltage at the side connected to the electrolytic capacitor 14C-1 lower than the DC voltage at the side connected to the DC link unit 13 so that the energy from the DC link unit 13 flows to the electrolytic capacitor 14C-1 and the energy is thus stored in the electrolytic capacitor 14C-1. The operation of the capacitor storage unit 14D having the electric double layer capacitor 14D-1 and DC-DC converter 14D-2 is substantially the same as that of the capacitor storage unit 14C having the electrolytic capacitor 14C-1 and DC-DC converter 14C-2, and therefore, will not be described herein.

The electrolytic capacitor 14C-1 has the characteristic that it can be charged and discharged quickly and continually but its capacitance density is low. On the other hand, the electric double layer capacitor 14D-1 has a high capacitance density but cannot be charged and discharged continually because it then generates a considerable amount of heat. In view of this, in the second embodiment of the present invention, in cases where the storage/supply of power is relatively slow in speed and takes time to complete, the energy control unit 15 controls the DC-DC converter 14D-2 in the capacitor storage unit 14D so that the electric double layer capacitor 14D-1 is used to supply or store the power, and in cases where the storage/supply of power occurs continually but can be handled with a relatively small capacitance, the energy control unit 15 controls the DC-DC converter 14C-2 in the capacitor storage unit 14C so that the electrolytic capacitor 14C-1 is used to supply or store the power.

According to the present invention, in a motor drive apparatus including an AC/DC converter which converts AC power supplied from an AC power supply to DC power, a DC/AC converter which converts DC power to AC power for driving a motor or converts AC power regenerated by the motor back to DC power, and an energy storage unit which stores or outputs the DC power, provisions are made to use a capacitor storage unit or a flywheel storage unit by appropriately selecting one or the other in the energy storage unit; this offers the effect of efficiently suppressing power peaks of the AC power supply, while at the same time, enhancing the efficiency of energy utilization in the energy storage unit.

The present invention can be applied to a machine tool system in which motors are provided one for each drive shaft of a machine tool and in which the motors (servo motors) are driven by a motor drive apparatus including an AC/DC converter which converts input AC power to DC power and a DC/AC converter which converts the DC power output from the AC/DC converter to AC power to be supplied as drive power to drive each motor.

What is claimed is:

1. A motor drive apparatus, comprising:
    an AC/DC converter configured to convert AC power supplied from an AC power supply to DC power;
    a DC/AC converter configured to convert DC power to AC power for driving a motor or convert AC power regenerated by the motor back to DC power;
    a DC link unit which connects a DC side of the AC/DC converter to a DC side of the DC/AC converter to deliver the DC power between the DC side of the AC/DC converter and the DC side of the DC/AC converter;
    an energy storage unit which includes at least one capacitor storage unit and at least one flywheel storage unit each of which is connected to the DC link unit and configured to store the DC power supplied from the DC link unit and supply the stored DC power to the DC link unit;
    a motor control unit configured to, based on a motor operation command for commanding operation of the motor, perform control so that the DC/AC converter outputs desired AC power; and
    an energy control unit configured to perform control so that the energy storage unit stores the DC power supplied from the DC link unit or supplies the stored DC power to the DC link unit,
    wherein the energy control unit is configured to
        during acceleration control of the motor performed by the motor control unit, cause both the capacitor storage unit and the flywheel storage unit to supply the DC power to the DC link unit at a constant power supply ratio between amounts of the DC power that the capacitor storage unit and the flywheel storage unit supply to the DC link unit, and
        during deceleration control of the motor performed by the motor control unit, cause both the capacitor storage unit and the flywheel storage unit to store the DC power from the DC link unit at a constant a power storage ratio between amounts of the DC power that the capacitor storage unit and the flywheel storage unit store from the DC link unit.

2. The motor drive apparatus according to claim 1, wherein, when the AC power that is supplied from the AC power supply to the motor via the AC/DC converter, the DC link unit, and the DC/AC converter exceeds a predetermined limiting value, the energy control unit is configured to perform control so that the energy storage unit outputs the DC power necessary to provide an amount of AC power equal to the AC power required to drive the motor minus the predetermined limiting value.

3. The motor drive apparatus according to claim 1, wherein, when the AC power regenerated by the motor and returned to the AC power supply via the DC/AC converter, the DC link unit, and the AC/DC converter exceeds a predetermined limiting value, the energy control unit is configured to perform control so that the energy storage unit stores the DC power obtained by converting an amount of AC power equal to the AC power regenerated by the motor minus the predetermined limiting value.

4. The motor drive apparatus according to claim 1, wherein the energy control unit is configured to perform control so that the energy storage unit stores the DC power from the DC link unit when the motor is stopped or when the AC power necessary for driving the motor is not greater than a predetermined value.

5. The motor drive apparatus according to claim 1, wherein
    when the motor control unit controls the motor to accelerate at a first acceleration rate, the energy control unit is configured to cause the capacitor storage unit and the flywheel storage unit to supply the DC power to the DC link unit at a first power supply ratio between an amount of the DC power that the capacitor storage unit supplies to the DC link unit and an amount of the DC power that the flywheel storage unit supplies to the DC link unit, and
    when the motor control unit controls the motor to accelerate at a second acceleration rate greater than the first acceleration rate, the energy control unit is configured to cause the capacitor storage unit and the flywheel storage unit to supply the DC power to the DC link unit at a second power supply ratio between the amount of the DC power that the capacitor storage unit supplies to the DC link unit and the amount of the DC power that the flywheel storage unit supplies to the DC link unit, and
    the second power supply ratio is greater than the first power supply ratio.

6. A motor drive apparatus, comprising:
    an AC/DC converter configured to convert AC power supplied from an AC power supply to DC power;
    a DC/AC converter configured to convert DC power to AC power for driving a motor or convert AC power regenerated by the motor back to DC power;
    a DC link unit which connects a DC side of the AC/DC converter to a DC side of the DC/AC converter to deliver the DC power between the DC side of the AC/DC converter and the DC side of the DC/AC converter;
    an energy storage unit which includes at least one capacitor storage unit and at least one flywheel storage unit each of which is connected to the DC link unit and configured to store the DC power supplied from the DC link unit and supply the stored DC power to the DC link unit;
    a motor control unit configured to, based on a motor operation command for commanding operation of the motor, perform control so that the DC/AC converter outputs desired AC power; and an energy control unit configured to perform control so that the energy storage unit stores the DC power supplied from the DC link unit or supplies the stored DC power to the DC link unit, wherein the energy control unit performs control so that
the DC power that the energy storage unit supplies to the DC link unit is supplied only from the capacitor storage unit when the supply of the DC power from the energy storage unit is started, and when the amount of DC power stored in the capacitor storage unit has decreased to or below a predetermined amount of power, the DC power is supplied only from the flywheel storage unit.

7. The motor drive apparatus according to claim 6, wherein the energy control unit performs control so that the DC power that the energy storage unit stores from the DC link unit is stored only in the capacitor storage unit when the storage of the DC power by the energy storage unit is started, and when the amount of DC power stored in the capacitor storage unit has reached or exceeded a predetermined amount of power, the DC power is stored only in the flywheel storage unit.

8. The motor drive apparatus according to claim 6, wherein
a charging or discharging speed of the capacitor storage unit is greater than that of the flywheel storage unit, and
a storable amount of energy of the capacitor storage unit is smaller than that of the flywheel storage unit.

9. A motor drive apparatus, comprising:
an AC/DC converter configured to convert AC power supplied from an AC power supply to DC power;
a DC/AC converter configured to convert DC power to AC power for driving a motor or convert AC power regenerated by the motor back to DC power;
a DC link unit which connects a DC side of the AC/DC converter to a DC side of the DC/AC converter to deliver the DC power between the DC side of the AC/DC converter and the DC side of the DC/AC converter;
an energy storage unit which includes at least one capacitor storage unit and at least one flywheel storage unit each of which is connected to the DC link unit and configured to store the DC power supplied from the DC link unit and supply the stored DC power to the DC link unit;
a motor control unit configured to, based on a motor operation command for commanding operation of the motor, perform control so that the DC/AC converter outputs desired AC power; and
an energy control unit configured to perform control so that the energy storage unit stores the DC power supplied from the DC link unit or supplies the stored DC power to the DC link unit,
wherein the energy control unit is configured to perform control so that, when the rate of increase of the DC power that the energy storage unit supplies to the DC link unit is not greater than a predetermined value, the DC power is supplied only from the flywheel storage unit.

10. The motor drive apparatus according to claim 9, wherein the energy control unit is configured to perform control so that, when the rate of increase of the DC power that the energy storage unit supplies to the DC link unit is greater than the predetermined value, the DC power is supplied only from the capacitor storage unit.

11. The motor drive apparatus according to claim 9, wherein the energy control unit is configured to perform control so that, when the rate of increase of the DC power that the energy storage unit stores from the DC link unit is not greater than a predetermined value, the DC power is stored only in the flywheel storage unit.

12. The motor drive apparatus according to claim 11, wherein the energy control unit is configured to perform control so that, when the rate of increase of the DC power that the energy storage unit stores from the DC link unit is greater than the predetermined value, the DC power is stored only in the capacitor storage unit.

13. The motor drive apparatus according to claim 11, wherein the energy control unit is configured to perform control so that, when the rate of increase of the DC power that the energy storage unit stores from the DC link unit is greater than the predetermined value, the DC power is stored in both the capacitor storage unit and the flywheel storage unit.

14. The motor drive apparatus according to claim 9, wherein the energy control unit is configured to perform control so that, when the rate of increase of the DC power that the energy storage unit supplies to the DC link unit is greater than the predetermined value, the DC power is supplied from both the capacitor storage unit and the flywheel storage unit.

15. A motor drive apparatus, comprising:
an AC/DC converter which converts AC power supplied from an AC power supply to DC power;
a DC/AC converter which converts DC power to AC power for driving a motor or converts AC power regenerated by the motor back to DC power;
a DC link unit which connects a DC side of the AC/DC converter to a DC side of the DC/AC converter and delivers the DC power from one to the other and vice versa;
an energy storage unit which includes at least one capacitor storage unit and at least one flywheel storage unit each of which is connected to the DC link unit and stores the DC power supplied from the DC link unit or supplies the stored DC power to the DC link unit;
a motor control unit which, based on a motor operation command for commanding operation of the motor, performs control so that the DC/AC converter outputs desired AC power; and
an energy control unit which performs control so that the energy storage unit stores the DC power supplied from the DC link unit or supplies the stored DC power to the DC link unit,
wherein the energy control unit performs control so that
the DC power that the energy storage unit supplies to the DC link unit is supplied only from the capacitor storage unit when an amount of DC power supplied from the energy storage unit to the DC link unit is not larger than a predetermined amount of power, and
when the amount of DC power supplied from the energy storage unit to the DC link unit is larger than the predetermined amount of power, the DC power is supplied only from the flywheel storage unit or from both the capacitor storage unit and the flywheel storage unit.

16. The motor drive apparatus according to claim 15, wherein the energy control unit performs control so that
the DC power that the energy storage unit stores from the DC link unit is stored only in the capacitor storage unit when an amount of DC power stored in the energy storage unit from the DC link unit is not larger than a predetermined amount of power, and
when the amount of DC power stored in the energy storage unit from the DC link unit is larger than the predetermined amount of power, the DC power is stored only in the flywheel storage unit or in both the capacitor storage unit and the flywheel storage unit.

17. The motor drive apparatus according to claim 16, wherein the energy control unit performs control so that, when the amount of DC power stored in the energy storage unit from the DC link unit is larger than the predetermined amount of power, the DC power is stored only in the flywheel storage unit.

18. The motor drive apparatus according to claim 15, wherein the energy control unit performs control so that, when the amount of DC power supplied from the energy storage unit to the DC link unit is larger than the predetermined amount of power, the DC power is supplied only from the flywheel storage unit.

\* \* \* \* \*